US012698068B2

(12) United States Patent
Liu et al.

(10) Patent No.: US 12,698,068 B2
(45) Date of Patent: Aug. 4, 2026

(54) POWER DISTRIBUTION AND DRIVING SYSTEM FOR REMOTELY UNDERWATER OPERATED VEHICLE

(71) Applicant: ZHUZHOU CRRC TIMES ELECTRIC CO., LTD., Zhuzhou (CN)

(72) Inventors: Kean Liu, Zhuzhou (CN); Dinghua Zhang, Zhuzhou (CN); Jing Shang, Zhuzhou (CN); Bo Peng, Zhuzhou (CN); Xiangyang Zhang, Zhuzhou (CN); Haoping Liu, Zhuzhou (CN); Mingyuan Yang, Zhuzhou (CN); Wei Xiao, Zhuzhou (CN); Yinggu Zhu, Zhuzhou (CN); Shaolong Xu, Zhuzhou (CN); Zhihao Chen, Zhuzhou (CN); Jinyu Liao, Zhuzhou (CN); Yao Zhou, Zhuzhou (CN); Renxiong Li, Zhuzhou (CN); Xuan Wu, Zhuzhou (CN); Chang Liu, Zhuzhou (CN); Shufang Tang, Zhuzhou (CN)

(73) Assignee: ZHUZHOU CRRC TIMES ELECTRIC CO., LTD., Zhuzhou (CN)

( * ) Notice: Subject to any disclaimer, the term of this patent is extended or adjusted under 35 U.S.C. 154(b) by 391 days.

(21) Appl. No.: 18/251,200

(22) PCT Filed: Nov. 20, 2020

(86) PCT No.: PCT/CN2020/130338
§ 371 (c)(1),
(2) Date: Apr. 28, 2023

(87) PCT Pub. No.: WO2022/088315
PCT Pub. Date: May 5, 2022

(65) Prior Publication Data
US 2023/0406469 A1      Dec. 21, 2023

(30) Foreign Application Priority Data
Oct. 30, 2020    (CN) .......................... 202011197244.5

(51) Int. Cl.
*H02M 7/48* (2007.01)
*B60L 53/20* (2019.01)
(Continued)

(52) U.S. Cl.
CPC .............. *B63G 8/001* (2013.01); *B60L 53/20* (2019.02); *B63G 8/08* (2013.01); *H02M 1/0077* (2021.05);
(Continued)

(58) Field of Classification Search
CPC .......... H02M 1/14; H02M 1/34; H02M 1/342; H02M 1/4225; H02M 3/00; H02M 3/1566;
(Continued)

(56) References Cited

U.S. PATENT DOCUMENTS 9,849,954 B1    12/2017  Jun et al.
2003/0102720 A1*  6/2003  Baggs ................. E21B 33/0355
340/853.1
(Continued)

FOREIGN PATENT DOCUMENTS

CN      205883420 U      1/2017
CN      106463045 A      2/2017
(Continued)

OTHER PUBLICATIONS

International Search Report and Written Opinion issued for International Patent Application No. PCT/CN2020/130338, Date of mailing: Jul. 30, 2021, 16 pages including English translation.

*Primary Examiner* — Kawing Chan
*Assistant Examiner* — Charles S Laughlin
(74) *Attorney, Agent, or Firm* — HSML P.C.

(57) ABSTRACT

The invention provides a power distribution and drive system for a remotely underwater operated vehicle ROV, comprises: a high-voltage DC power supply device, located above the water surface to provide high-voltage DC voltage to the ROV; a DC buck conversion device, connected to the (Continued)

high-voltage DC power supply device through a cable for converting the high-voltage DC voltage to a low-voltage DC voltage to supply power to the ROV, wherein the DC buck conversion device comprises multiple parallel DC conversion modules, each DC conversion module bearing an average load current to supply power to the ROV; and at least one thruster, which comprises a propeller, a synchronous motor, and a driver.

10 Claims, 9 Drawing Sheets

(51) Int. Cl.

| | |
|---|---|
| *B63G 8/00* | (2006.01) |
| *B63G 8/08* | (2006.01) |
| *H02M 1/00* | (2006.01) |
| *H02M 3/07* | (2006.01) |
| *H02M 7/25* | (2006.01) |

(52) U.S. Cl.
CPC .............. *H02M 3/07* (2013.01); *H02M 7/25* (2013.01); *B60L 2210/12* (2013.01); *B63G 2008/007* (2013.01)

(58) Field of Classification Search
CPC .. H02M 3/28; H02M 3/3353; H02M 3/33546; H02M 3/33569; H02M 3/33592; H02M 3/3372; H02M 3/338; H02M 5/04; H02M 5/10; H02M 5/40; H02M 7/05; H02M 7/42; H02M 7/44; H02M 7/49; H02M 7/70; H02M 1/0045; H02M 1/0054

See application file for complete search history.

(56) References Cited

U.S. PATENT DOCUMENTS

| | | | |
|---|---|---|---|
| 2006/0022525 A1* | 2/2006 | Landry ..................... | H02J 1/06 |
| | | | 307/86 |
| 2012/0210926 A1* | 8/2012 | Storm, Jr. ............... | B63C 11/26 |
| | | | 114/337 |
| 2013/0200617 A1 | 8/2013 | Smith et al. | |
| 2016/0126843 A1 | 5/2016 | Kelly | |
| 2017/0179745 A1* | 6/2017 | Tritschler ................ | B60L 53/14 |
| 2019/0195028 A1* | 6/2019 | Fripp ..................... | H01R 13/15 |
| 2020/0269707 A1 | 8/2020 | Oi et al. | |
| 2021/0172295 A1* | 6/2021 | Fripp ........................ | H02J 7/34 |

FOREIGN PATENT DOCUMENTS

| | | |
|---|---|---|
| CN | 108206627 A | 6/2018 |
| CN | 109120171 A | 1/2019 |
| CN | 109361311 A | 2/2019 |
| CN | 109428325 A | 3/2019 |
| CN | 112366961 A | 2/2021 |
| CN | 112421956 A | 2/2021 |
| JP | 2006231951 A | 9/2006 |

* cited by examiner

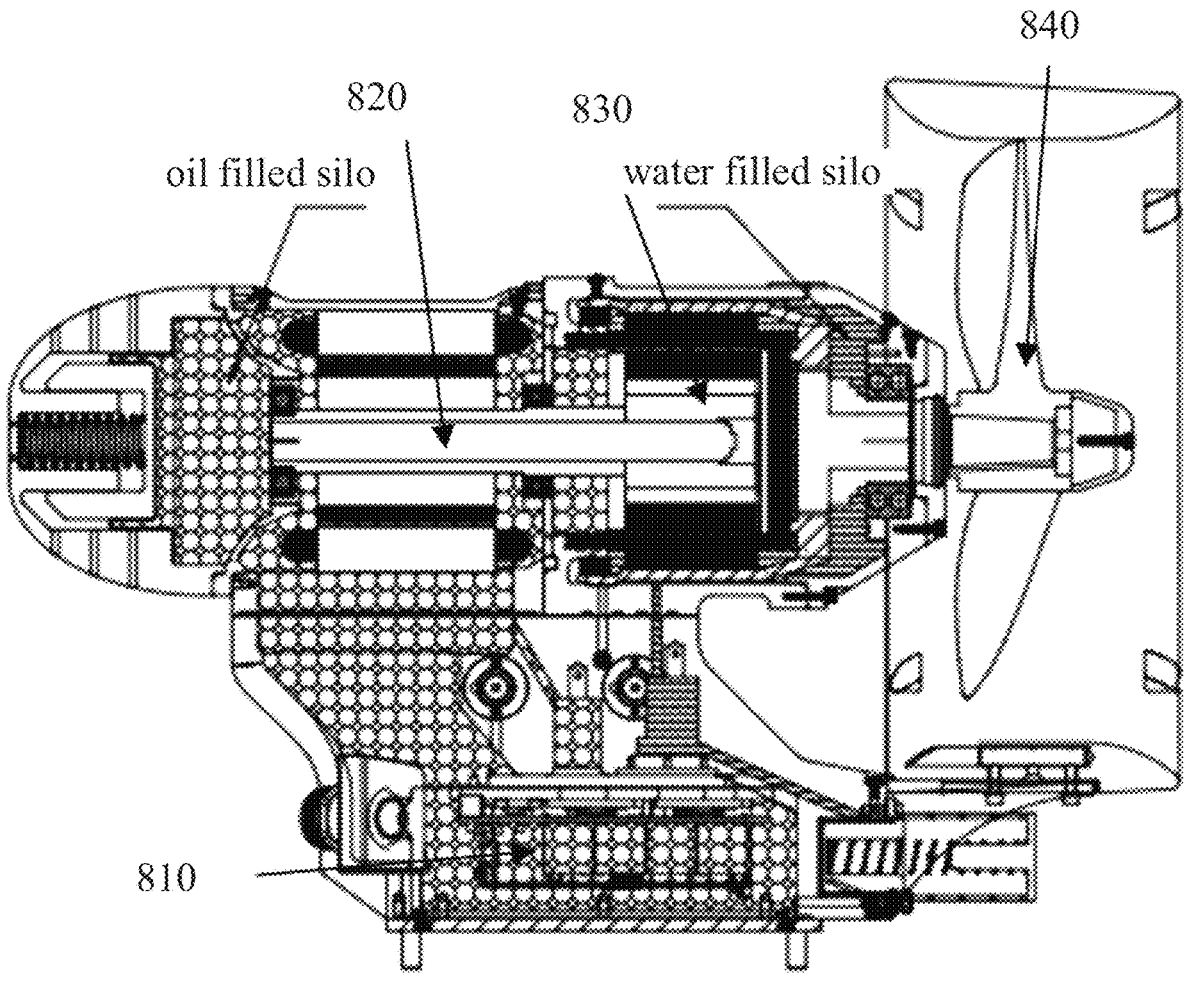
Fig.    8

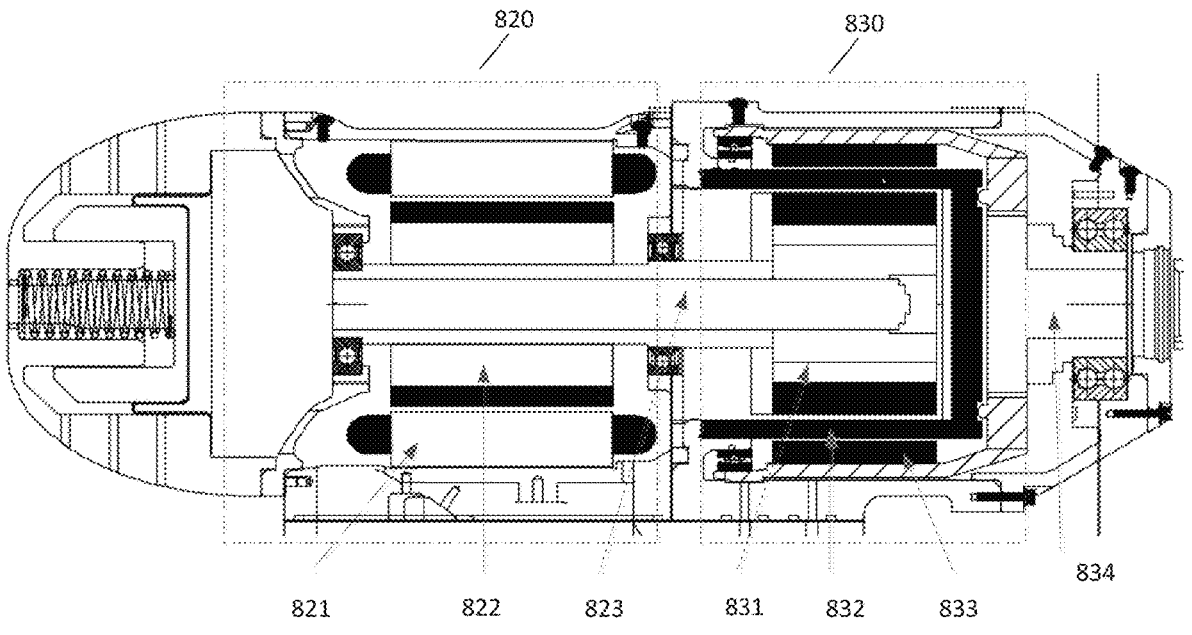
Fig.    9

POWER DISTRIBUTION AND DRIVING SYSTEM FOR REMOTELY UNDERWATER OPERATED VEHICLE

TECHNICAL FIELD

The invention relates to power supply and drive technology of remotely underwater operated vehicle, in particular to power distribution and drive system of remotely underwater operated vehicle.

BACKGROUND

Remotely Underwater Operated Vehicle (ROV) is a powerful tool for human to explore the marine environment and develop marine resources. Compared with the traditional hydraulic ROV, the electric ROV has many advantages, such as small system weight and size, which effectively reduces the power and size of launch and recovery system (LARS) on ship deck; easy to integrate, assemble, disassemble, and convenient for moving and transporting; excellent handling performance and simple operation, effectively improving underwater working ability and reducing maintenance labor costs; low risk of oil pollution leakage, more conducive to environmental protection and regulatory evaluation; it is easier to integrate intelligent functions such as navigation, control, and operation, and has the technical foundation for upgrading to autonomous underwater vehicle (AUV). In summary, the advantages of lower maintenance costs, higher reliability and efficiency, thinner and cheaper umbilical cables, and lower environmental pollution risks have made the electric ROV the development direction of the next generation of the ROV technology.

With the continuous expansion of application fields, the ROV is also developing towards the direction of longer continuous working time, more flexible handling maneuverability and greater propulsion power, therefore the ROV (especially the working level ROV) has increasingly high requirements for energy and power. The power required for the working level ROV is basically all transmitted by the shipboard power supply device through long-distance umbilical cables. In order to meet the needs of deep-sea operations, the umbilical cables used for underwater power supply and communication for the ROV are usually longer than 3000 meters, and even up to 10000 meters or more in depth. In order to reduce the resistance of the ROV to underwater movement, it is required to use a cable diameter as small as possible. Long and thin cables suffer severe losses during operation, resulting in low transmission efficiency. At the same time, the mode of transmission of electricity will greatly affect the topological structure and operation mode of underwater power converters of the ROV, resulting in a large weight and volume of underwater power converters.

Therefore, as an important component and one of the key technologies of the electric ROV, remote power supply and distribution and drive system will provide a stable and powerful power source and power guarantee for the normal operation of underwater vehicle, which is of great significance for the application of deep-sea work vehicle.

SUMMARY

A brief overview of one or more aspects is given below to provide a basic understanding of these aspects. This overview is not an exhaustive overview of all aspects envisaged, nor is it intended to identify the key or decisive elements in all aspects nor attempt to define the scope of any or all aspects. Its only purpose is to present some concepts of one or more aspects in a simplified form so as to give a more detailed description of the order later.

According to one aspect of the invention, there is provided a power distribution and drive system for a remotely underwater operated vehicle ROV, comprising:

a high-voltage DC power supply device, located above the water surface to provide high-voltage DC voltage to the ROV;

a DC buck conversion device, connected to the high-voltage DC power supply device through a cable for converting the high-voltage DC voltage to a low-voltage DC voltage to supply power to the ROV, wherein the DC buck conversion device comprises multiple parallel DC conversion modules, each DC conversion module bearing an average load current to supply power to the ROV and at least one thruster, which comprises a propeller, a synchronous motor, and a driver.

In one embodiment, the high-voltage DC power supply device comprises a voltage compensation module. The voltage compensation module determines the voltage drop on the cable based on the output current of the high-voltage DC power supply device, and performs voltage drop compensation control based on the voltage drop and the target setting value of the ROV end to output a stable high-voltage DC voltage.

In one embodiment, the high-voltage DC power supply device comprises a transformer, a rectifier, and a DC filter, wherein the voltage compensation module determines a voltage setting value at the rectifier end based on the target setting value and the voltage drop at the ROV end, and performs rectification control on the rectifier based on a deviation between the voltage setting value at the rectifier end and the output voltage of the high-voltage DC power supply device to output a stable high-voltage DC voltage.

In one embodiment, the voltage compensation module calculates the voltage drop on the cable based on the output current of the high-voltage DC power supply device and the characteristic parameters of the cable.

In one embodiment, the multiple DC conversion modules of the DC buck conversion device are respectively connected to the high-voltage DC input and low-voltage DC bus through corresponding input switches and output switches, and each DC conversion module exits the power supply in case of its own failure.

In one embodiment, the multiple DC conversion modules of the DC buck conversion device are communicatively connected to each other, and each DC conversion module comprises a predetermined number of p Buck units in series and a current-sharing and voltage-sharing controller, wherein the current-sharing and voltage-sharing controller of each DC conversion module determines a current-sharing control amount based on the output current values of all DC conversion modules and the voltage output value of the current DC conversion module, determines p voltage-sharing control adjustment amount based on the voltage values of the flyover capacitors of p−1 Buck units from the low voltage end to the high voltage end of the current DC conversion module and the corresponding target reference values, and performs flow control and voltage-sharing control on the current DC conversion module based on the current-sharing control amount and the p voltage-sharing control adjustment amount.

In one embodiment, the current-sharing control amount and the p voltage-sharing control adjustment amount are both duty cycle signals. The current-sharing and voltage-sharing controller of each DC conversion module determine the p comprehensive control amounts based on the sum of the current-sharing control amount and the p voltage-sharing control adjustment amount, and input them respectively and correspondingly into the switches of the p Buck units of the current DC conversion module to perform current-sharing and voltage-sharing control.

In one embodiment, the system also comprises a standby energy storage unit coupled to a low-voltage DC bus through a DC-DC converter. The standby energy storage unit is charged by the DC buck conversion device through the DC-DC converter during normal operation of the cable, and emergency power is supplied to the ROV through the DC-DC converter in case of cable failure.

In one embodiment, the synchronous motor comprises a permanent magnet synchronous motor, the thruster also comprises a magnetic gear that cooperates with the permanent magnet synchronous motor. The magnetic gear comprises a high-speed rotor, an outer magnet rotor, and a pole stator that magnetically couples the high-speed rotor to the outer magnet rotor. The high-speed rotor of the magnetic gear is coupled to the rotor of the permanent magnet synchronous motor through an internal transmission shaft, and the outer magnet rotor of the magnetic gear transmits power to the propeller through the external transmission shaft.

In one embodiment, the system also comprises multiple thrusters and a distribution controller for distributing propulsive force to the multiple thrusters. The distribution controller determines the identification values of the external force and torque vector U(n+1) of the multiple thrusters using an online identification algorithm:

$$\hat{U}(n+1) = \begin{bmatrix} \hat{b}_{1,1} & \hat{b}_{1,2} & \dots & \hat{b}_{1,m} \\ \hat{b}_{2,1} & \hat{b}_{2,2} & \dots & \hat{b}_{2,m} \\ \vdots & \vdots & \ddots & \vdots \\ \hat{b}_{6,1} & \hat{b}_{6,2} & \dots & \hat{b}_{6,m} \end{bmatrix} \cdot \begin{bmatrix} t_1(n+1) \\ t_2(n+1) \\ \vdots \\ t_m(n+1) \end{bmatrix}$$

where n is the time factor index, $T=[t_1, t_2, \dots t_m]^T$ is the thruster command vector, m is the number of thrusters. Perform optimization based on the $\hat{U}(n+1)$ and the demanded values of the external force and torque vectors of each thruster $U_{demand}$ and the thruster command vectors $T=[t_1, t_2, \dots, t_m]^T$ of each thruster to solve the thruster commands:

$$\min c_1 \cdot \left(U_{demand} - \hat{U}(m+1)\right) + c_2 \cdot \sum_{i=1}^{m} (t_i(n+1) - \bar{t}(n+1))^2$$

$$\text{s.t. } t_{j,min} \le t_j(n+1) \le t_{j,max}, j \in [1, 2, \dots, m]$$

where $c_1$ and $c_2$ are weight parameters, $\bar{t}(n+1)$ is the average value of all current thrusters output, $t_{j,min}$ is the minimum propulsive force of the thruster, $t_{j,max}$ is the maximum propulsive force value.

In one embodiment, the distribution controller performs a recursive least squares parameter identification algorithm with a forgetting factor on the linearized model V(n+1)=A·V(n)+B·T(n) of the ROV to obtain the identification value of the matrix $$B = \begin{bmatrix} \hat{b}_{1,1} & \hat{b}_{1,2} & \dots & \hat{b}_{1,m} \\ \hat{b}_{2,1} & \hat{b}_{2,2} & \dots & \hat{b}_{2,m} \\ \vdots & \vdots & \ddots & \vdots \\ \hat{b}_{6,1} & \hat{b}_{6,2} & \dots & \hat{b}_{6,m} \end{bmatrix},$$

Where $V=[u,v,w,p,q,r]^T$ and u,v,w respectively represent the velocities of the ROV in the X, Y, and Z axis directions, p,q,r represent the pitch angular velocity, heading angular angle, and roll angular velocity of the ROV, $$A = \begin{bmatrix} a_{1,1} & a_{1,2} & \dots & a_{1,6} \\ a_{2,1} & a_{2,2} & \dots & a_{2,6} \\ \vdots & \vdots & \ddots & \vdots \\ a_{6,1} & a_{6,2} & \dots & a_{6,6} \end{bmatrix}, B = \begin{bmatrix} b_{1,1} & b_{1,2} & \dots & b_{1,m} \\ b_{2,1} & b_{2,2} & \dots & b_{2,m} \\ \vdots & \vdots & \ddots & \vdots \\ b_{6,1} & b_{6,2} & \dots & b_{6,m} \end{bmatrix}.$$

BRIEF DESCRIPTION OF THE DRAWINGS

After reading the detailed description of the disclosed embodiments in conjunction with the drawings below the above characteristics and advantages of the invention can be better understood. In the drawings, the components are not necessarily drawn to scale, and components with similar related characteristics or features may have the same or similar references.

FIG. 8 shows a structural diagram of a thruster according to one aspect of the invention; and FIG. 9 shows a sectional view of permanent magnet synchronous motor and magnetic gear according to one aspect of the invention.

DETAILED DESCRIPTION

The present invention is described in detail below in conjunction with the drawings and specific embodiments. Note that the following aspects described in conjunction with the drawings and specific embodiments are only illustrative and should not be understood as limiting the scope of protection of the present invention.

Figure 1:
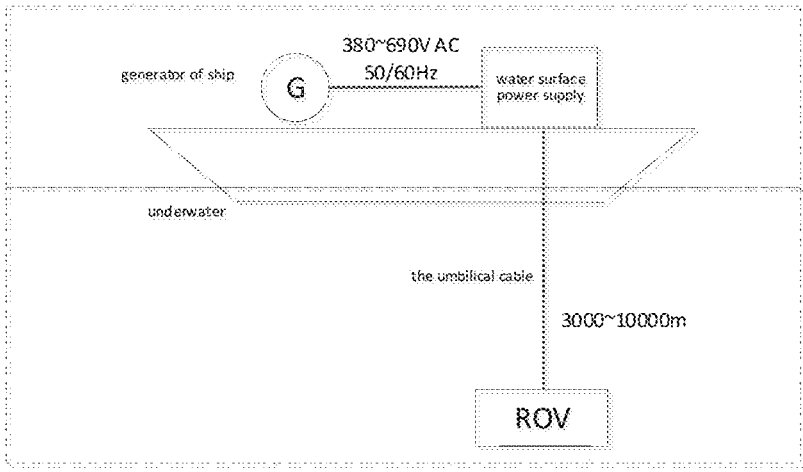
FIG. 1 shows a schematic diagram of the power supply system of the ROV in the working environment.

FIG. 1 shows a schematic diagram of the power supply system of the ROV in a working environment. The power required for the ROV (especially the working level ROV) is basically all transmitted by the shipboard power supply device through long-distance umbilical cables. In order to meet the needs of deep-sea operations, the umbilical cables used for underwater power supply and communication for the ROV are usually longer than 3000 meters, and even up to 10000 meters or more in depth.

Figure 2:
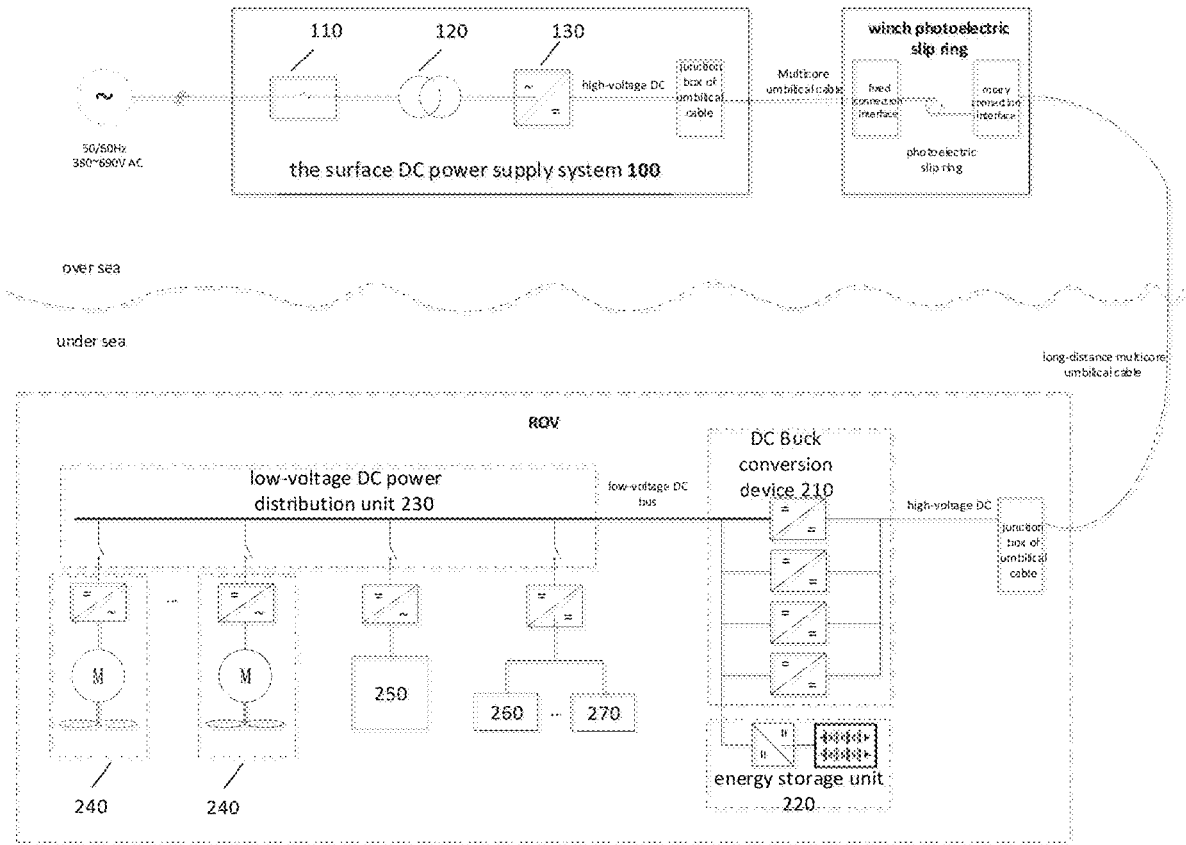
FIG. 2 shows a schematic diagram of an ROV efficient power supply and drive system according to one aspect of the invention.

FIG. 2 shows a schematic diagram of an ROV efficient power supply and drive system according to one aspect of the invention. As shown in FIG. 2, the ROV power supply and drive system of the invention comprises two parts: the above water part and the underwater part. The above water part comprises a high-voltage DC power supply device 100, while the underwater part mainly comprises a DC buck conversion device 210, an energy storage unit 220, a low-voltage DC microgrid and power distribution unit 230, and at least one thruster 240. The underwater part also comprises a controller 250 and a sensor 260. The DC buck conversion device 210, the energy storage unit 220, the low-voltage DC microgrid and power distribution unit 230, the thruster 240, the work tool 250, the controller 260, and the sensor 270 of the underwater part are generally part of the ROV.

In practice, the three-phase low-voltage AC power supply for ships is input to the high-voltage DC power supply device 100, converted into high-voltage DC voltage, and transmitted to the junction box of the ROV through the winch photoelectric slip ring and long-distance umbilical cables. The DC buck conversion device 210 on the ROV converts high-voltage DC to low-voltage DC voltage for power consumption by equipment (such as the thruster 240, the work tool 250, the controller 260, and the sensor 270 of the ROV) connected to the low-voltage DC bus of the ROV, at the same time, the energy storage unit 220 is connected to the low-voltage DC bus of the ROV to provide emergency power or completely replace the cable to provide power when the cable power supply is interrupted. The low-voltage DC bus of the ROV simultaneously provides power to the distributed integrated thruster, the work tool, the controller, etc.

The high-voltage DC power supply device 100 comprises a power distribution unit 110.

Figure 3:
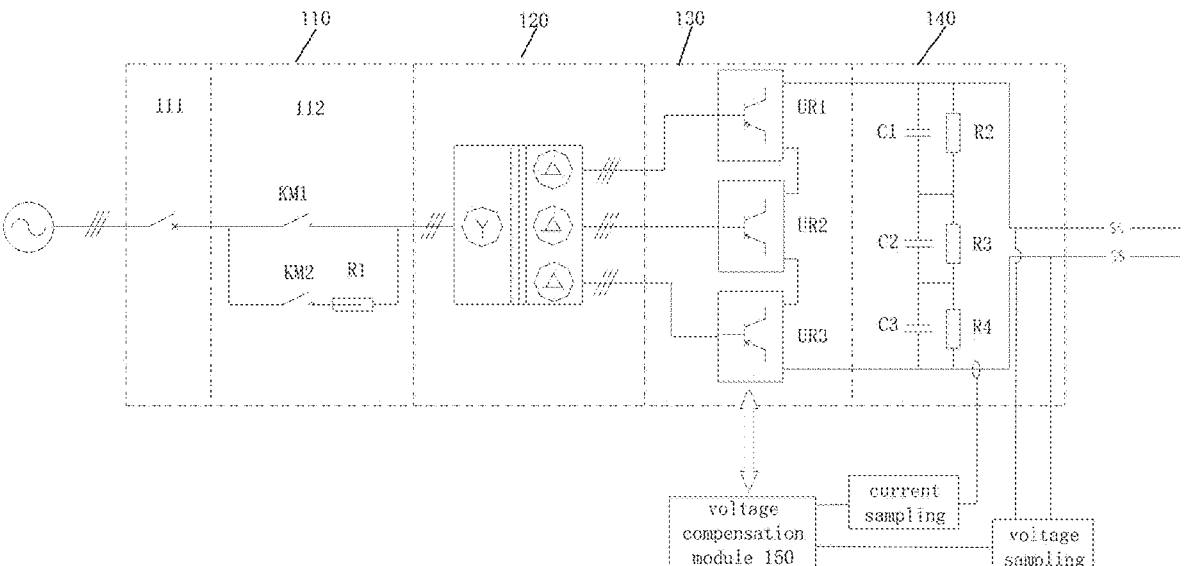
FIG. 3 shows a schematic diagram of an ROV high-voltage DC power supply device according to one aspect of the invention.

FIG. 3 shows a schematic diagram of an ROV high-voltage DC power supply device 100 according to one aspect of the invention. As shown in the drawing, the high-voltage DC power supply device 100 comprises a power distribution unit 110, a step-up transformer 120, a rectifier 130, and a DC filter and discharge unit 140.

The power distribution unit 110 comprises an input switch 111 and a charging unit 112. The input switch 111 is used to connect the input power supply of ships and disconnect the input when the surface power supply and back-end load of the ROV are overloaded or short-circuited, avoiding serious harm to the power supply system of ships. The charging unit 112 comprises components such as a charging switch KM2, a charging resistor R1, a bypass switch KM1, and the like. Before the surface power supply of the ROV is powered on, the bypass switch KM1 is disconnected, and the current is limited to a controllable range through the charging resistor R1 when the charging switch KM2 is closed. After the work is completed, the charging switch KM2 is disconnected and the bypass switch KM1 is closed, allowing the system to enter a normal working state.

Under the normal working state, the step-up transformer 120 performs a step-up conversion on the voltage of the ship, whose output is rectified by the rectifier 130, and then the back-end filtering and discharging unit 140 performs DC filtering and discharges the output high-voltage DC voltage.

According to one aspect of the invention, the rectifier 130 is a multi-pulse rectifier with multiple rectifier modules connected in series with each other, and the step-up transformer 120 is a phase-shifting transformer with multiple secondary windings, with a preset difference between the multiple secondary windings and a number corresponding to the number of rectifier modules.

In the embodiment shown in FIG. 3, the primary side of the step-up transformer 120 is connected in a triangle, and the secondary side has three angle-connected secondary windings with a phase offset of 20°, which is used to boost the input power supply of ships into three independent sets of power supplies to provide input power to an 18-pulse rectifier. To meet the voltage levels of different connected power supplies, the primary side of the step-up transformer 120 has multiple tap options with different transformation ratios.

The ROV surface power supply system based on multi-pulse rectifier has high input power factor, low input current harmonics, is friendly to the power grid of ships, low output DC ripple, and is friendly to long-distance cables and underwater remotely operated vehicles.

Correspondingly, the rectifier 130 comprises a rectifier module UR1, a rectifier module UR2, and a rectifier module UR3. These rectifier modules are each composed of a three-phase controllable rectifier, and the DC outputs of the three rectifier modules are connected in series to convert the output AC power of the transformer into a high-voltage DC voltage.

The DC filter unit is formed by connecting three capacitors C1, C2, and C3 in series to absorb the ripple of the output voltage of the rectifier 130, ensuring the safe operation of the back-end long cable.

According to one aspect of the invention, the high-voltage DC power supply device 100 further comprises a voltage compensation module 150 for determining the voltage drop on the cable based on the output current of the DC filter and discharge unit 140, and performing voltage drop compensation control on the rectifier 130 based on the voltage drop and the target setting value at the ROV end to output a stable high-voltage DC voltage.

The working power of the deep-sea working vehicle is transmitted by a high-voltage DC power supply on the surface through a long-distance umbilical cable. Because of the influence of the cable's own impedance, skin effect and proximity effect, the input voltage at the ROV end is greatly affected by the cable length and operating conditions, which has a negative impact on underwater electrical equipment. Therefore, the invention has built a mathematical model of long-distance umbilical cable considering skin and proximity effects, which does not require voltage acquisition signals at the ROV end, and directly estimates the voltage drop of the umbilical cable based on information such as the output voltage and current of the surface DC power supply system, and automatically compensates to ensure the voltage stability of the underwater module.

Figure 4:
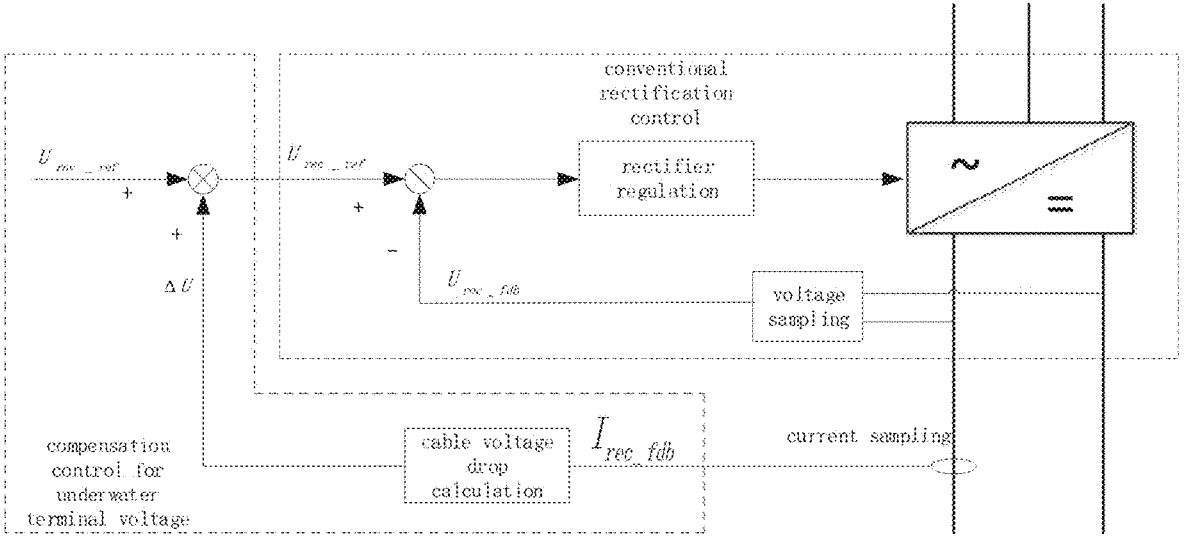
FIG. 4 shows a control block diagram of umbilical terminal voltage compensation according to one aspect of the invention.

FIG. 4 shows a control block diagram of umbilical terminal voltage compensation according to one aspect of the invention, the control block diagram is implemented by a voltage compensation module 150.

As shown in FIG. 4, first calculate the voltage drop on the cable, then determine the voltage setting value at the rectifier end based on the target setting value and voltage drop at the ROV end, and perform rectification control on the rectifier based on the deviation between the setting value and the output voltage obtained by sampling to output a stable high-voltage DC voltage.

In a specific embodiment, the supplementary process comprises the following steps:

Step S1: first collecting the rectifier output DC voltage value $U_{rec\_fdb}$ and DC current value $I_{rec\_fdb}$.

Step S2: calculating cable voltage drop based on the collected DC current value $I_{rec\_fdb}$ and cable characteristic parameters.

In one embodiment, calculating the voltage drop $\Delta U = K_T \cdot K_S \cdot K_S \cdot K_P \cdot L \cdot I/(r \cdot S)$, where $\Delta U$ is the voltage drop of the umbilical cable, $K_T$ is the temperature coefficient of cable resistance, $K_S$ is the skin effect coefficient of cable resistance, $K_P$ is the proximity effect coefficient of cable resistance, L is the cable length, I is the output current, r is the electrical conductivity of the cable material, S is the cross-sectional area of the cable.

Step S3: adding the voltage setting value $U_{rov\_ref}$ at the ROV end to the cable voltage drop $\Delta U$ to obtain the voltage setting value $U_{rec\_ref}$ at the rectifier end.

Step S4: controlling and outputting the deviation between the rectifier end voltage setting value $U_{rec\_ref}$ and the sampling value $U_{rec\_fdb}$ through the rectifier adjuster, to drive the rectifier, thereby ensuring the stability of the ROV end voltage under various operating conditions.

The rectifier adjuster here performs PI control based on the voltage according to the deviation between $U_{rec\_ref}$ and $U_{rec\_fdb}$, to obtain the PI control amount used to drive the rectifier, that is, the rectifier control signal. Depending on the type of rectifier, the rectifier control signal is a trigger angle signal or a duty cycle signal. For example, for a thyristor type rectifier, the rectifier control signal is a trigger angle signal, while for an IGBT type rectifier, the rectifier control signal is a duty cycle signal.

The use of a surface high-voltage DC power supply system with automatic compensation for underwater terminal voltage greatly reduces the power loss of long-distance transmission in the deep sea and reduces the diameter of expensive umbilical cable wires. The automatic compensation control method for underwater terminal voltage drop based on the mathematical model of long-distance umbilical cable automatically compensates for the losses of the power supply voltage drop under different cable lengths and load operating conditions during long-distance ROV power supply, ensuring the stability of ROV power supply voltage.

The power required for the ROV is basically all supplied by the surface high-voltage DC power supply through long-distance umbilical cables. The ROV has a compact structure, and its internal electrical components are powered by low-voltage DC. Therefore, there is an urgent need for a DC buck conversion device with high power density, high reliability, and high device efficiency. The underwater DC buck conversion device is used to convert high-voltage DC voltage into low-voltage DC voltage, supplying power to various electrical components inside the ROV.

According to one aspect of the invention, the DC buck conversion device adopts a multi-module parallel topology and redundant control to meet the requirements of high power supply and high reliability. The module adopts a multi-level Buck topology without the isolation transformer, which has low cost, high power density, and high efficiency, and at the same time, the structure of input and output sharing ground simplifies the insulation monitoring and ground protection of underwater power supply.

Figure 5:
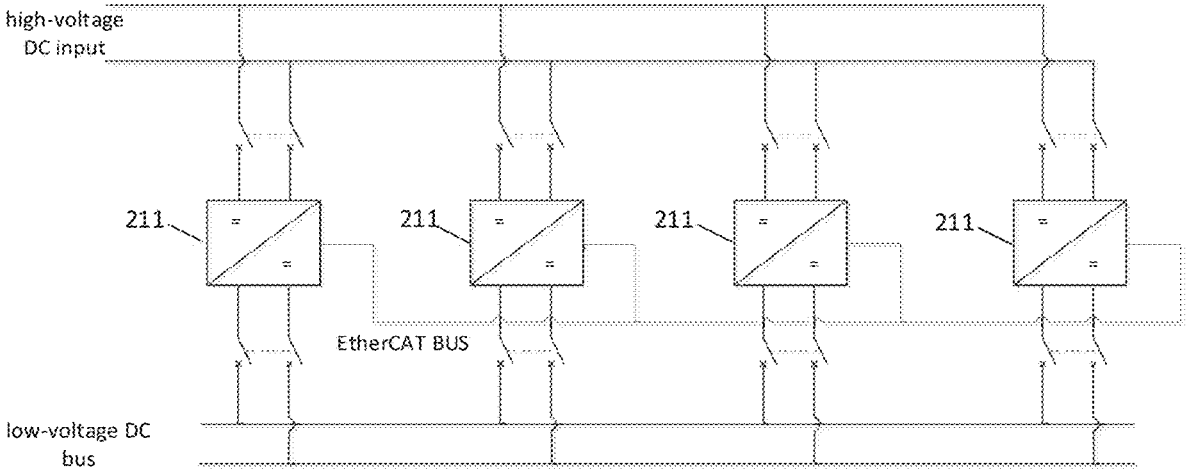
FIG. 5 shows a topological block diagram of a DC buck conversion device according to one aspect of the invention.

FIG. 5 shows a topological block diagram of a DC buck conversion device 210 according to one aspect of the invention.

Based on the requirements of working level underwater vehicles for high power supply and high reliability, the DC buck conversion device 210 adopts a redundant structure in which multiple (4 in the drawing are taken as examples) DC conversion modules 211 operate in parallel. All DC conversion modules 211 is connected to high-voltage DC cables from the water surface through switches. Each module independently converts high-voltage voltage into low-voltage DC voltage, and is connected to a DC bus through switches to provide power for various electrical components within the ROV.

Each DC conversion module 211 is capable of being combined together to provide total power conversion, or being operated separately to provide a single power conversion. During normal operation, these multiple DC conversion modules 211 are connected in parallel to supply power to the load, and each DC conversion module bears an average load current. When one or k of the DC conversion modules 211 fails, they automatically exit the power supply by disconnecting the corresponding input and output switches, while the remaining DC conversion modules 211 continue to provide current to the load. The ROV operates normally or derating works according to the number of redundant modules. In the most extreme case, when all other DC conversion modules 211 are failure, the ROV still achieves recycling through power supply of 1 normal module.

Figure 6:
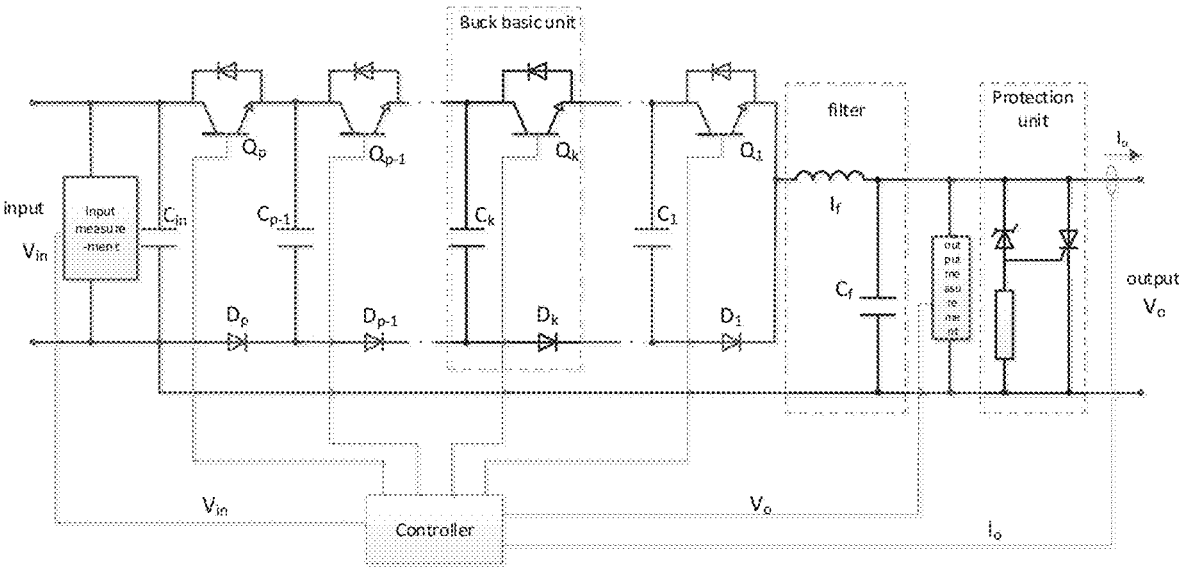
FIG. 6 shows a topological block diagram of a DC conversion module according to one aspect of the invention.

As shown in FIG. 5 and FIG. 6, multiple DC conversion modules 211 of DC buck conversion device 210 are connected to each other in communication. In one example, multiple DC conversion modules 211 communicate through the EtherCAT communication bus.

All power modules in the parallel system transmit their own load current through the EtherCAT communication bus. When a module is failure, it will exit automatically and no longer send its own current to the EtherCAT communication bus. Failure of a module without output current will not cause the whole system to work. The current-sharing control method based on EtherCAT communication bus not only has the advantage of high current sharing accuracy, but also adapts to the redundant working mode.

In addition, a multi-level DC buck converter control method based on the EtherCAT communication bus is provided, which ensures the voltage-sharing of multi-component series in the module and the current-sharing of multi-module parallel, and is suitable for redundant working mode.

Figure 7:
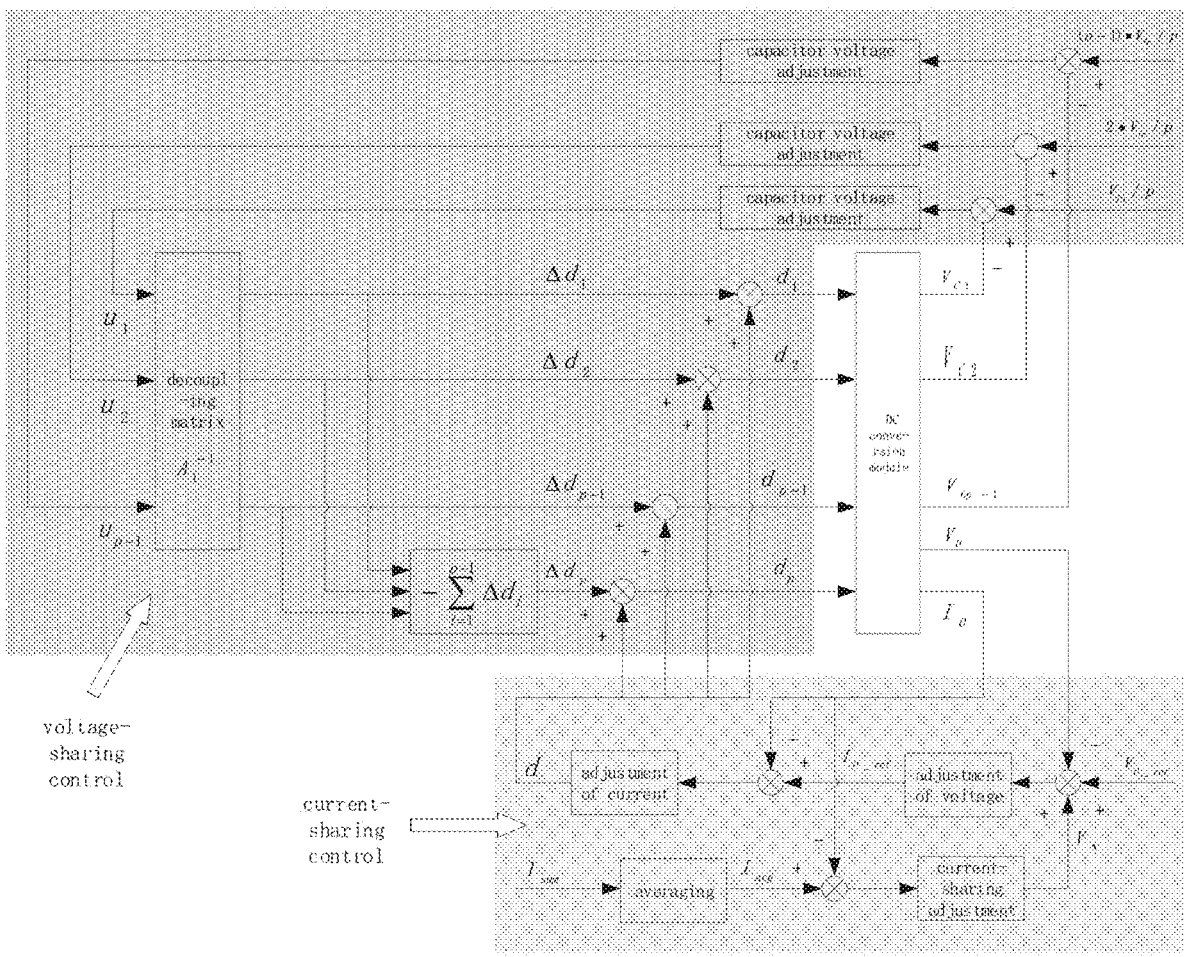
FIG. 7 shows a control block diagram of a multi-level DC converter according to one aspect of the invention.

FIG. 6 shows a topological block diagram of a DC conversion module according to one aspect of the invention, and FIG. 7 shows a control block diagram of a multi-level DC converter according to one aspect of the invention. The control of the DC conversion device 210 is described below in combination with FIG. 6 and FIG. 7.

Each module of the DC buck conversion device 210 adopts multi-level Buck series topology with input and output sharing ground, to reduce stress of components, reduce filter capacity, and greatly improve power density and module efficiency, and at the same time this configuration also meets the requirements of underwater insulation monitoring and grounding protection of the ROV electrical system for input and output sharing ground.

As shown in FIG. 6, the DC conversion module 211 mainly comprises p series Buck basic units, filters, protection units (such as Crowbar and Zener protection), input and output measurement units, and controllers.

The Buck unit is the basic unit of the converter, which consists of the flyover capacitor $C_k$, the switch $Q_k$ and the diode $D_k$ and so on. Interleaved complementary conduction between the switch $Q_k$ and the diode $D_k$. The phases of the conductors of the p switches are in turn different $2\pi/p$. When the duty cycle d of all the switches is the same, the voltage above the flyover capacitor $C_k$ (k=1, 2 ..., p−1) is $kV_{in}/p$. When the switch $Q_k$ or the diode $D_k$ is switched off, the voltage stress it bears is the difference in voltage between adjacent flyover capacitors $V_{Ck}$, that is, $V_{Dk}=V_{Qk}=V_{Ck}-V_{Ck-1}=V_{in}/p$.

The filter is composed of filter inductor and capacitor, to filter out high-order harmonics of output voltage of multi-level Buck circuit.

The protection circuit comprises components such as the stable-voltage diode, the resistance, the thyristor. When the output voltage of the DC conversion module exceeds the limit value, the stable-voltage diode is turned on. When the output voltage further rises beyond the stabilized value of the stable-voltage diode and the on-voltage of the thyristor, the silicon control is turned on and the output voltage is pulled down, to protect the rear part from over-voltage damage.

Controller and input and output measurement parts are used to control and protect the DC conversion module according to input, output voltage and current.

In practical circuits, the switching characteristics and duty cycle of each switch cannot be exactly the same, which often results in the deviation of the flyover capacitor voltage from the flat value, which makes the converter not working properly. Multiple DC buck conversion modules operate in parallel at the same time, which may lead to unbalanced currents in each module in practice. Therefore, according to one aspect of the invention, a multi-level DC buck converter control scheme that combines voltage-sharing and circulation control is provided.

According to one aspect of the invention, each DC conversion module 211 comprises a current-sharing and voltage-sharing controller, such as the controller shown in FIG. 6. The current-sharing and voltage-sharing controller determines the current-sharing control amount d based on the output current values of all DC conversion modules 211 and the voltage output value of its own DC conversion module, and determines p voltage-sharing control adjustment amounts $\Delta d_i$ (i=1, 2, . . . , p) based on the voltage values of the flyover capacitors of the first to p-first Buck units from the low-voltage end to the high-voltage end of the current DC conversion module and the corresponding target reference values, and performs current-sharing control and voltage-sharing control on the current DC conversion module based on the current-sharing control amount d and the p voltage-sharing control adjustment amounts $\Delta d_i$.

According to the current-sharing control of the invention, in one embodiment, each parallel DC conversion module has a unique ID number, and all normally operating modules regularly send their own output current information to the communication bus. Each module regularly calculates the average output current value $I_{avg}$ of all normally operating modules based on the output current information received from the EtherCAT communication bus. The difference between the average current value and the output current $I_O$ of this module is used to obtain a current-sharing error signal, and the error signal is passed through the current-sharing adjuster to obtain a voltage adjustment signal $V_A$. The adjustment value $V_A$ corrects the output voltage error value and ultimately achieves output current balancing for each DC conversion module.

In one embodiment, the process of calculating the current-sharing control amount d comprises the following steps:

Step S1: the controller collects the output DC voltage value $V_O$ and the output DC current value $I_O$ in real time.

Step S2: each DC conversion module sends its own output current value to the EtherCAT communication bus, while each DC conversion module receives the output current value from other modules from the EtherCAT communication bus, and adds it to its own output current value to obtain the total current value $I_{sum}$ of the DC conversion system. Then, the average output current value $I_{avg}$ of each module is obtained based on the number of normal working modules.

Step S3: subtracting the average current value $I_{avg}$ of the DC conversion module and the output current $I_O$ of this module to obtain the current-sharing error signal, and obtaining the voltage adjustment signal $V_A$ through the current-sharing adjuster. In one embodiment, the voltage adjustment herein is a PI controller based on current. The principle of a PI controller or PI adjuster is well known to those skilled in the art, and will not be described here.

Step S4: subtracting the output DC voltage reference value $V_{O\_ref}$ and the feedback value $V_O$ to obtain the voltage error signal, and adding the voltage adjustment signal $V_A$ output by the current-sharing adjuster, and outputting the DC current reference value $I_{O\_ref}$ through the voltage adjuster output. In one embodiment, the voltage adjuster herein is a PI controller based on current.

Step S5: subtracting the output DC current reference value $I_{O\_ref}$ and the feedback value $I_O$ to obtain the current error signal, and obtaining the current-sharing control output d through the current adjuster, and finally being superimposed with the voltage-sharing control signals of each switch and output to the DC buck converter.

According to the voltage-sharing control of the invention, in one embodiment, it is a voltage-sharing control based on capacitor voltage decoupling. The collected value $V_{Ci}$ of the flying capacitor voltage shown in FIG. 7 is compared respectively with the reference value $i \cdot V_{in}/p$ (i=1, 2, . . . , p−1), and then the error signal $u_i$ (i=1, 2, . . . , p−1) is obtained through the capacitor voltage adjuster. The vector $u=[u_i(u_1, u_1, . . . , u_{p-1}]^T$ is multiplied by the decoupling matrix $A_1^{-1}$ to obtain $\Delta d_i$ (i=1, 2, . . . , p−1), and then $\Delta d_p$ is calculated from $$\Delta d_p = -\sum_{i=1}^{p-1} \Delta d_i.$$

Add $\Delta d_i$ (i=1, 2, . . . , p) and d to obtain a comprehensive control signal $d_k$ (k=1, 2, . . . , p) for each switch. The comprehensive control amount herein is a duty cycle signal that is output to the DC conversion module to control the normal operation of the multi-level DC conversion module.

In one example, the process of calculating the voltage-sharing control adjustment amount $\Delta d_i$ comprises the following steps:

Step S1: the controller collects the input DC voltage value $V_{in}$ and the voltage value $V_{Ci}$ (i=1, 2, . . . , p−1) of each flyover capacitor in real time.

Step S2: comparing respectively the collected value of the flyover capacitor voltage $V_{Ci}$ with the reference value $i \cdot V_{in}/p$ (i=1, 2, . . . , p−1) to obtain the error signal $u_i$ (i=1, 2, . . . , p−1) through the capacitor voltage adjuster. The voltage adjuster herein is PI controller based on current, to adjust the voltage deviation between the voltage collected value of the flyover capacitor and the reference value to an error signal $u_i$, and the error signal $u_i$ herein is duty cycle signal.

Step S3: multiplying the error signal vector $u=[u_1, u_1, \ldots, u_{p-1}]^T$ with the decoupling matrix $A_1^{-1}$ to obtain the first to p−1 flyover capacitor voltage-sharing control fine adjustment values $\Delta d_i(i=1, 2, \ldots, p-1)$. In an example, the calculation is as follows:

$$\begin{bmatrix} \Delta d_1 \\ \Delta d_2 \\ \vdots \\ \Delta d_{p-2} \\ \Delta d_{p-1} \end{bmatrix} = A^{-1} \cdot \begin{bmatrix} u_1 \\ u_2 \\ \vdots \\ u_{p-2} \\ u_{p-1} \end{bmatrix} = \begin{bmatrix} -1 & 1 & 0 & 0 & \ldots & 0 \\ 0 & -1 & 1 & 0 & \ldots & 0 \\ \vdots & \vdots & \vdots & \vdots & \ddots & \ldots \\ 0 & 0 & \ldots & 0 & -1 & 1 \\ -1 & -1 & \ldots & -1 & -1 & -2 \end{bmatrix}^{-1} \cdot \begin{bmatrix} u_1 \\ u_2 \\ \vdots \\ u_{p-2} \\ u_{p-1} \end{bmatrix}$$

Step S4: calculating the fine adjustment value $\Delta d_p$ of the p-th switch from $\Delta d_i(i=1, 2, \ldots, p-1)$ through formula $$-\sum_{i=1}^{p-1} \Delta d_i.$$

Step S5: adding the output value d of the current-sharing controller to the fine adjustment value $\Delta d_i(i=1, 2, \ldots, p)$ of the p switches to obtain the duty ratio $d_k(k=1, 2, \ldots, p)$ of each switch, and outputting it to the DC conversion module to control the normal operation of the multi-level DC conversion module.

As shown in FIG. 2, according to one aspect of the invention, a standby energy storage unit 220 is also provided for providing standby energy in the event of a cable failure.

The power consumption of the working level ROV is large, and the required power supply is basically all transmitted by the shipboard power supply device through long-distance umbilical cables. Due to the complex working environment in the deep sea, the power supply of the ROV will be interrupted due to umbilical cable breakage, all branch faults of the DC buck converter and other reasons, which will bring great risks to the ROV equipment. The invention combines the energy storage modules and the DC buck conversion modules in parallel for hybrid power supply to form an ROV underwater DC microgrid, which meets the requirements of distributed electrical equipment, not only simplifying the energy conversion process and improving energy conversion efficiency, but also further ensuring the reliability of ROV power supply.

When the cable power supply works normally, the high-voltage DC voltage on the water surface is depressurized by the DC converter to supply power to all electrical loads of the ROV. At the same time, the DC-DC converter connected to the low-voltage DC bus charges the battery of the energy storage unit 220, and the energy stored in the battery will be used to provide emergency power supply to the ROV when the cable power supply is interrupted due to a failure. When the cable power supply is interrupted, the energy storage unit 220 provides emergency standby power for the low-voltage DC bus through a DC-DC converter, which is used to float the submarine vehicle to the water surface through buoyancy regulation in emergency situations, and ensure that at least one thruster works.

In one embodiment, after the deep-sea vehicle is upgraded to an AUV, the cumbersome umbilical cable is capable of being removed, but its energy storage during long endurance is a key issue. At this time, the location where the DC buck conversion device was originally installed is capable of being replaced with a large-capacity energy storage module, to provide power for the long-term underwater work of the AUV.

In this case, the energy storage module and the DC buck conversion module are combined in parallel for power supply to form an ROV underwater DC microgrid, which meets the requirements of distributed electrical equipment, not only simplifies the energy conversion process and improves the energy conversion efficiency, but also further ensures the reliability of the ROV power supply. At the same time, the modular structure directly replaces the DC buck converter with a large-capacity energy storage module, providing power for long-term underwater work upgraded to an AUV in the future.

Returning to FIG. 2, the low-voltage DC voltage provided by the DC buck conversion device 210 is supplied to various electrical components of the ROV through the low-voltage DC power distribution unit 230, such as the thruster 240, the work tool 250, the controller 260, and the sensor 270. The low-voltage DC power distribution unit 230 comprises components such as switches and protections to provide access and protection functions for devices connected to the ROV low-voltage DC microgrid.

FIG. 8 shows a structural schematic diagram of a thruster 800 according to one aspect of the invention. According to one aspect of the invention, a distributed variable frequency drive scheme is used for the underwater thruster of the ROV. As shown in FIG. 8, each propulsor 800 integrates components such as a driver 810, a permanent magnet synchronous motor 820 with magnetic gear 830 transmission, and a propeller 840.

All components are integrated in an integrated aluminum alloy housing. By organically combining control, power electronics, motors, propellers, etc., the integration, miniaturization, and modularization of the appearance are achieved, thereby achieving more effective electromechanical energy conversion and transmission.

FIG. 9 shows a sectional view of a permanent magnet synchronous motor and magnetic gear according to one aspect of the invention.

As shown in FIG. 9, a permanent magnet synchronous motor with a magnetic gear combines a permanent magnet synchronous motor 820 with a magnetic gear 830. The permanent magnet synchronous motor 820 comprises a motor stator 821, a permanent magnet rotor 822, and other parts. The magnetic gear 830 comprises a high-speed rotor 831, a pole piece stator 832, an outer magnet rotor 833, and other parts. The magnetic gear high-speed rotor 831 is magnetically coupled to the outer magnet rotor 833 through the pole piece stator 832. The internal transmission shaft 823 connects the rotor 822 of the permanent magnet synchronous motor 820 and the high-speed rotor 831 of the magnetic gear 830.

The magnetic gear outer magnet transmits power to the propeller 840 coaxial with the magnetic gear outer magnet rotor 833 through the external transmission shaft 834. The magnetic gear 830 uses a permanent magnet to transmit torque between the input and output shafts, which transmits force into a hermetically sealed housing without the need for a radial shaft seal that is prone to leakage, making it more suitable for deep-sea vehicle applications that require high sealing performance.

In one embodiment, the thruster 800 uses a power module based on SiC component to convert the ROV underwater low-voltage DC low voltage into a three-phase AC voltage with adjustable frequency and amplitude according to the control commands of the ROV control system, to supply power to the stator windings of the permanent magnet synchronous motor 820. The stator 821 of the permanent magnet synchronous motor 820 is energized with three-phase alternating current, which forms a rotating magnetic field in the stator winding. It interacts with the permanent magnet rotor 822 to generate an electromagnetic torque output in the same direction as the stator rotating magnetic field, thereby converting electrical energy into output mechanical energy.

The internal transmission shaft 823 of the magnetic gear 830 mechanism connects the rotor 822 of the permanent magnet synchronous motor 820 and the high-speed rotor 831 of the magnetic gear 830. The magnetic gear outer magnet transmits power to the propeller 840 through the external transmission shaft 834. The magnetic gear 830 transmits torque between the input shaft and the output shaft through indirect contact form, and the propeller 840 is in direct contact with seawater. During rotation, the blades continuously push a large amount of seawater away, creating a forward propulsion force on the blades, thereby propelling the ROV movement.

The thruster 800 in this case uses magnetic coupling gears instead of mechanical gears to drive the propeller, which has the advantages of high transmission efficiency, good underwater sealing performance, small mechanical wear, and low operating noise.

According to one aspect of the invention, aiming at the problem of difficulty in propulsive force distribution caused by various factors such as difficulty in modeling underwater vehicles, and differences in the number and installation position of thrusters, an online thruster distribution algorithm for underwater vehicles based on model identification and linear optimization with inequality constraints is proposed. The algorithm does not require prior knowledge of the mathematical model of the underwater vehicle, the number of the thrusters, the installation position of the thrusters, and the installation angle, and completes the propulsive force distribution of the underwater vehicle through online parameter identification according to the external force and torque control requirements.

First, online identification is implemented to the mathematical model parameters of the ROV. As the underwater vehicle is a six degree of freedom motion, the following six degree of freedom nonlinear mathematical simulation is used to express the mathematical model of the underwater vehicle:

$$M \cdot \dot{V} + C(V) \cdot V + D(V) \cdot V = U$$

Where M represents the equivalent mass and inertia matrix, C(V) represents the Coriolis force and centripetal force coefficient matrix, D(V) represents the fluid damping coefficient matrix, V represents the vehicle speed state vector, U represents the external force and torque input vector. More specifically, $V = [u,v,w,p,q,r]^T$, u,v,w represent respectively the velocities of the underwater vehicle in the X, Y, and Z axis directions, p,q,r represent the pitch angular velocity, heading angular angle, and roll angular velocity of the underwater vehicle, $U = N \cdot T$, N is a transformation matrix, $u_1$, $u_2$, $u_3$ represent the propulsive force of the underwater vehicle in the X, Y, and Z axis directions, $u_4$, $u_5$, $u_6$ represent the pitch angle torque, heading angle torque, and roll angle torque of the underwater vehicle, $T = [t_1, t_2, \ldots, t_m]^T$ represents the thruster command vector, m represents the number of thrusters.

Through first order linearization of the above model, the following linearized model is obtained to approximately describe the motion process of the underwater vehicle:

$$V(n+1) = A \cdot V(n) + B \cdot T(n)$$

Where n is the time factor index, order:

$$A = \begin{bmatrix} a_{1,1} & a_{1,2} & \ldots & a_{1,6} \\ a_{2,1} & a_{2,2} & \ldots & a_{2,6} \\ \vdots & \vdots & \ddots & \vdots \\ a_{6,1} & a_{6,2} & \ldots & a_{6,6} \end{bmatrix}, B = \begin{bmatrix} b_{1,1} & b_{1,2} & \ldots & b_{1,6} \\ b_{2,1} & b_{2,2} & \ldots & b_{2,6} \\ \vdots & \vdots & \ddots & \vdots \\ b_{6,1} & b_{6,2} & \ldots & b_{6,6} \end{bmatrix}$$

Taking the X-axis velocity of an underwater vehicle as an example, the following expression formula is obtained based on the above formula:

$$u(n+1) = a_{1,1}u(n) + a_{1,2}v(n) + a_{1,3}w(n) + a_{1,4}p(n) + a_{1,5}q(n) + a_{1,6}r(n) + b_{1,1}t(1) + \ldots + b_{1,m}t(m)$$

Define: $\theta = [a_{1,1}, a_{1,2}, a_{1,3}, a_{1,4}, a_{1,5}, a_{1,6}, b_{1,1}, b_{1,2}, \ldots b_{1,m}]$ $\varphi = [u,v,w,q,p,r,t_1,t_2, \ldots t_m]$ Real-time parameter identification is performed using recursive least squares parameter identification methods with forgetting factors $$\hat{\theta}(n+1) - \hat{\theta}(n) + L(n) \cdot \left[ V(n+1) - \varphi^T(n+1) \cdot \hat{\theta}(n) \right]$$

$$L(n+1) = \frac{P(n) \cdot \varphi(n+1)}{\lambda + \varphi^T(n+1) \cdot P(n) \cdot \varphi(n+1)}$$

$$P(n+1) = \frac{1}{\lambda} \left[ I - L(n+1) \cdot \varphi^T(n+1) \right] \cdot P(n)$$

$$P(0) = p_0 I$$

$\hat{\theta} = [\hat{a}_{1,1}, \hat{a}_{1,2}, \hat{a}_{1,3}, \hat{a}_{1,4}, \hat{a}_{1,5}, \hat{a}_{1,6}, \hat{b}_{1,1}, \hat{b}_{1,2}, \ldots \hat{b}_{1,m}]$, represents the identification parameters obtained through the above algorithm.

Similarly, by performing the above real-time parameter identification on the speed in the Y and Z axis directions, as well as the pitch angular velocity, heading angular angle, and roll angular velocity, the identification parameter matrix $\hat{B}$ of the B matrix is obtained, thereby obtaining the relationship between the propulsive force of each thruster and the external force and torque input of the underwater vehicle, as follows:

$$\hat{U}(n+1) = \begin{bmatrix} \hat{b}_{1,1} & \hat{b}_{1,2} & \ldots & \hat{b}_{1,m} \\ \hat{b}_{2,1} & \hat{b}_{2,2} & \ldots & \hat{b}_{2,m} \\ \vdots & \vdots & \ddots & \vdots \\ \hat{b}_{6,1} & \hat{b}_{6,2} & \ldots & \hat{b}_{6,m} \end{bmatrix} \cdot \begin{bmatrix} t_1(n+1) \\ t_2(n+1) \\ \vdots \\ t_m(n+1) \end{bmatrix}$$

Wherein, $\hat{U}(n+1)$ is the identification value of the external force and torque vector of multiple thrusters.

Then, optimization is performed based on $\hat{U}(n+1)$ and the demanded value $U_{demand}$ of the external force and torque vectors of each thruster, as well as the thruster command vector $T = [t_1, t_2, \ldots, t_m]^T$ of each thruster, to solve the thruster command:

$$\min c_1 \cdot \left( U_{demand} - \hat{U}(n+1) \right) + c_2 \cdot \sum_{i=1}^{m} (t_i(n+1) - \bar{t}(n+1))^2$$

$$\text{s.t. } t_{j,min} \leq t_j(n+1) \leq t_{j,max}, j \in [1, 2, \ldots, m]$$

Wherein, $c_1$ and $c_2$ are a weight parameter, $\bar{t}(n+1)$ is the average value of all current thruster outputs, $t_{j,min}$ is the minimum propulsive force of the thruster, $t_{j,max}$ is the maximum propulsive force value.

In the above optimization algorithm, the optimization goal is to optimize the weight sum of the error between $U(n+1)$ and the demanded value $U_{demand}$ of the external force and torque vectors of each thruster as well as the variance of the propulsive force of all thrusters, and by solving its minimum value to achieve the goal of maximize the average utilization performance of all thrusters while the propulsive force distribution results of the underwater vehicle are as close as possible to the demanded value. By solving the above optimization problems, the ROV adaptive torque distribution is completed. The distribution algorithm here is implemented by, for example, controller 260.

In the invention, the torque distribution problem is transformed into a linear optimization problem by taking the force and torque of the thruster acting on the underwater vehicle as the optimization object, reducing the difficulty of the optimization algorithm. Taking the variance of all torques as an optimization object reduces the problem of one thruster having too large an output value while others with similar functions having too small an output value during redundant control process, and maximize the average utilization of all thruster capabilities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A power distribution and driving system for a remotely underwater operated vehicle ROV (ROV), comprises: a high-voltage DC power supply device, located above the water surface to provide a high-voltage DC voltage to the ROV, the high-voltage DC power supply device comprising: a voltage compensation module configured to: determine a voltage drop on a cable based on an output current of the high-voltage DC power supply device, and perform voltage drop compensation control based on the voltage drop and a target setting value of the ROV to output a stable high-voltage DC voltage; a DC buck conversion device, connected to the high-voltage DC power supply device through the cable; the DC buck conversion device being configured to: convert the high-voltage DC voltage to a low-voltage DC voltage to supply power to the ROV, wherein the DC buck conversion device comprises a plurality of parallel DC conversion modules, each DC conversion module equally bearing average load current to supply power to the ROV; and at least one thruster, the thruster comprising: a propeller, a synchronous motor, and a driver.

2. The power distribution and driving system of claim 1, wherein the high-voltage DC power supply device comprises:
a transformer,
a rectifier, and
a DC filter,
wherein the voltage compensation module is further configured to:
determine a voltage setting value at the rectifier end based on the target setting value and the voltage drop at the ROV, and
perform rectification control on the rectifier based on a deviation between the voltage setting value at the rectifier terminal and the output voltage of the high-voltage DC power supply device to output the stable high-voltage DC voltage.

3. The power distribution and driving system of claim 1, wherein the voltage compensation module is further configured to calculate the voltage drop on the cable based on the output current of the high-voltage DC power supply device and the characteristic parameters of the cable.

4. The power distribution and driving system of claim 1, wherein the plurality of DC conversion modules of the DC buck conversion device are respectively connected to the high-voltage DC input and low-voltage DC bus through corresponding input switches and output switches, and each DC conversion module exits power supply in case of its own failure.

5. The power distribution and driving system of claim 1, wherein the plurality of DC conversion modules of the DC buck conversion device are communicatively connected to each other, and each DC conversion module comprises:
a predetermined number p of Buck converters connected in series, and
a current-sharing and voltage-sharing controller,
wherein the current-sharing and voltage-sharing controller of each DC conversion module is further configured to:
determine a current-sharing control amount based on the output current values of all DC conversion modules and the voltage output value of the current DC conversion module,
determine p voltage-sharing control adjustment amounts based on voltage values and corresponding target reference values of the flyover capacitors of p−1 Buck converters from a low voltage end to a high voltage end of the current DC conversion module, and
perform flow control and voltage-sharing control on the current DC conversion module based on the current-sharing control amount and the p voltage-sharing control adjustment amounts.

6. The power distribution and driving system of claim 5, wherein
the current-sharing control amount and the p voltage-sharing control adjustment amounts are both duty cycle signals, and
the current-sharing and voltage-sharing controller of each DC conversion module is further configured to:
determine p comprehensive control amounts based on a sum of the current-sharing control amount and the p voltage-sharing control adjustment amounts, and input the p comprehensive control amounts respectively and correspondingly into the switches of the p Buck converters of the current DC conversion module to perform current-sharing and voltage-sharing control.

7. The power distribution and driving system of claim 1, further comprising:
a standby energy storage unit coupled to a low-voltage DC bus through a DC-DC converter, wherein
the standby energy storage unit is charged by the DC buck conversion device through the DC-DC converter during normal operation of the cable, and
emergency power is supplied to the ROV through the DC-DC converter in case of cable failure.

8. The power distribution and driving system of claim 1, wherein
the synchronous motor comprises:
a permanent magnet synchronous motor, and
the thruster further comprises:
a magnetic gear that cooperates with the permanent magnet synchronous motor, the magnetic gear comprising:
a high-speed rotor,
an outer magnet rotor, and
a pole stator that magnetically couples the high-speed rotor to the outer magnet rotor,
the high-speed rotor of the magnetic gear is coupled to the rotor of the permanent magnet synchronous motor through an internal transmission shaft, and
the outer magnet rotor of the magnetic gear transmits power to the propeller through the external transmission shaft.

9. The power distribution and driving system of claim 1, comprising:
a plurality of the thrusters and a distribution controller for distributing propulsive force to the plurality of thrusters, the distribution controller determines an identification value of an external force and torque vector $U(n+1)$ of the plurality of thrusters using an online identification algorithm:

$$\hat{U}(n+1) = \begin{bmatrix} \hat{b}_{1,1} & \hat{b}_{1,2} & \cdots & \hat{b}_{1,m} \\ \hat{b}_{2,1} & \hat{b}_{2,2} & \cdots & \hat{b}_{2,m} \\ \vdots & \vdots & \ddots & \vdots \\ \hat{b}_{6,1} & \hat{b}_{6,2} & \cdots & \hat{b}_{6,m} \end{bmatrix} \cdot \begin{bmatrix} t_1(n+1) \\ t_2(n+1) \\ \vdots \\ t_m(n+1) \end{bmatrix}$$

wherein n is the time factor index, $T=[t_1, t_2, \ldots, t_m]^T$ is the thruster command vector, m is the number of thrusters, optimization is performed based on the $\hat{U}(n+1)$ and the demanded value of the external force and torque vectors of each thruster $U_{demand}$ and the thruster command vector $T=[t_1, t_2, \ldots, t_m]^T$ of each thruster to solve the thruster command:

$$\min c_1 \cdot \left( U_{demand} - \hat{U}(n+1) \right) + c_2 \cdot \sum_{i=1}^{m} (t_i(n+1) - \bar{t}(n+1))^2$$

$$\text{s.t. } t_{j,min} \le t_j(n+1) \le t_{j,max}, \, j \in [1, 2, \ldots, m]$$

wherein $c_1$ and $c_2$ are weight parameters, $\bar{t}(n+1)$ is the average value of all current thrusters output, $t_{j,min}$ is the minimum propulsive force of the thruster, $t_{j,max}$ is the maximum propulsive force value.

10. The power distribution and driving system of claim 9, wherein the distribution controller performs a recursive least squares parameter identification algorithm with a forgetting factor on the linearized model $V(n+1)=A \cdot V(n)+B \cdot T(n)$ of the ROV to obtain the identification value of the matrix $$B = \begin{bmatrix} b_{1,1} & b_{1,2} & \cdots & b_{1,m} \\ b_{2,1} & b_{2,2} & \cdots & b_{2,m} \\ \vdots & \vdots & \ddots & \vdots \\ b_{6,1} & b_{6,2} & \cdots & b_{6,m} \end{bmatrix},$$

wherein $V=[u,v,w,p,q,r]^T$, and u,v,w respectively represent the velocities of the ROV in the X, Y, and Z axis directions, p,q,r represent the pitch angular velocity, heading angular angle, and roll angular velocity of the ROV, $$A = \begin{bmatrix} a_{1,1} & a_{1,2} & \cdots & a_{1,6} \\ a_{2,1} & a_{2,2} & \cdots & a_{2,6} \\ \vdots & \vdots & \ddots & \vdots \\ a_{6,1} & a_{6,2} & \cdots & a_{6,6} \end{bmatrix}, B = \begin{bmatrix} b_{1,1} & b_{1,2} & \cdots & b_{1,m} \\ b_{2,1} & b_{2,2} & \cdots & b_{2,m} \\ \vdots & \vdots & \ddots & \vdots \\ b_{6,1} & b_{6,2} & \cdots & b_{6,m} \end{bmatrix}.$$

\* \* \* \* \*